United States Patent Office 3,793,317
Patented Feb. 19, 1974

3,793,317
2-NITROIMIDAZOLES
Alden Gamaliel Beaman, North Caldwell, N.J., and William Paul Tautz, New York, N.Y., assignors to Hoffmann-La Roche Inc., Nutley, N.J.
No Drawing. Original application Apr. 6, 1969, Ser. No. 816,838, now Patent No. 3,646,057, dated Feb. 29, 1972. Divided and this application Sept. 2, 1971, Ser. No. 177,900
Int. Cl. C07d 87/40
U.S. Cl. 260—247.5 R       4 Claims

ABSTRACT OF THE DISCLOSURE 2-nitroimidazoles substituted in the 1-position with a lower alkyl amide or a lower alkyl amine which are useful as germicides and anti-protozoal agents.

RELATED APPLICATIONS

This is a division of application Ser. No. 816,838, filed Apr. 6, 1969, which issued as U.S. Pat. 3,646,057 on Feb. 29, 1972.

SUMMARY OF THE INVENTION

In accordance with this invention, it has been found that 2-nitroimidazoles selected from the group consisting of compounds of the formula:

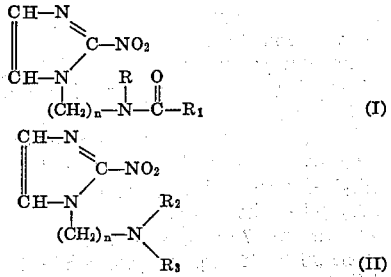

wherein $n$ is an integer from 2 to 6; R is hydrogen or lower alkyl; $R_1$ is lower alkyl, halo lower alkyl, aryl, aryl lower alkyl, aryloxy lower alkyl, or a substituted or unsubstituted 5 or 6 membered heterocyclic aromatic ring; $R_2$ and $R_3$ are hydrogen, lower alkyl, and taken together with the attached nitrogen form a 5 or 6 membered substituted or unsubstituted heterocyclic ring;

and acid addition salts thereof are active against bacteria, pathogenic yeasts and protozoa.

In accordance with this invention, the compounds of Formula I above are formed by reacting an alkali metal salt of 2-nitroimidazole with a compound of the formula:

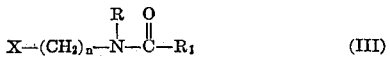

wherein $n$, R and $R_1$ are as above, and X is a halogen. The compounds of the Formula II above are formed by reacting an alkali metal salt of 2-nitroimidazole with a compound of the formula:

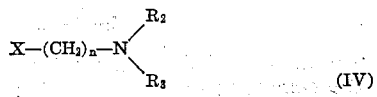

wherein X, $n$, $R_2$ and $R_3$ are as above.

DETAILED DESCRIPTION OF THE INVENTION

The term "halogen" as used throughout the specification includes all forms of halogens, i.e., chlorine, fluorine, bromine and iodine, with bromine, chlorine and fluorine being preferred. The term "lower alkyl" as used through-out the specification denotes both branched chain and straight chain saturated hydrocarbons containing from 1 to 7 carbon atoms such as methyl, ethyl, n-propyl, isopropyl, n-butyl, isobutyl, sec-butyl, pentyl, hexyl and the like. The term "lower alkoxy" as used throughout the specification designates lower "alkoxy" radicals having from 1 to 7 carbon atoms such as methoxy, ethoxy, isopropoxy, etc. The term "halo-lower alkyl" as used throughout the specification denotes mono halo lower alkyl as well as poly halo lower alkyl radicals such as trichloromethyl, trifluoromethyl, 1,2-dichloroethyl, and the like.

The term "aryl" includes mononuclear aryl groups such as phenyl or substituted phenyl. The aryl substituents can be a polynuclear aryl group such as naphthyl, anthryl, phenanthryl, azulyl, or substituted polynuclear aryl groups. In accordance with a preferred embodiment of this invention, the term "aryl" designates phenyl or substituted phenyl. Furthermore, the preferred substituted aryl radicals are those aryl radicals wherein one or more (preferably from 1 to 2) hydrogen groups has been replaced by halogen, lower alkyl, lower alkoxy, trifluoromethyl, nitro or amino.

The term "aryl lower alkyl" designates aryl lower alkyl groups wherein "aryl" and "lower alkyl" are defined as above. The term "aryloxy lower alkyl" designates an "aryloxy lower alkyl" moiety wherein aryl and lower alkyl are defined as above. Among the aryloxy groups are included phenoxy, chlorophenoxy, anthryloxy, etc. The term "5 or 6 membered heterocyclic groups" includes both substituted and unsubstituted heterocyclic groups containing from 1 to 2 hetero atoms which can be either oxygen, nitrogen or sulfur.

When $R_1$, in the compound of Formula I is a di or tri-substituted halo lower alkyl, the preferred alkyl group is methyl. Among the preferred dihalo or trihalo substituents on the methyl group which constitutes a preferred embodiment of $R_1$ in the compound of Formula I above are trifluoromethyl, trichloromethyl, dichloromethyl, etc.

When $R_1$ is aryloxy lower alkyl, the preferred compound of Formula I above has the formula:

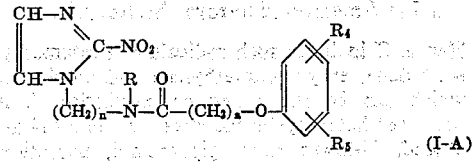

wherein R and $n$ are as above, and $R_4$ and $R_5$ are each independently hydrogen, halogen, lower alkyl, nitro, amino, lower alkoxy or trifluoromethyl, and $a$ is an integer from 1 to 6.

In a preferred embodiment of compounds of the Formula I–A, R is hydrogen and $n$ is an integer of from 2 to 4. Among the preferred phenoxy substituents in the compound of Formula I–A are included phenoxy, p-chlorophenoxy, o-chlorophenoxy, o,p-dichlorophenoxy, p-methylphenoxy, p-ethylphenoxy, o-methoxyphenoxy, o-nitrophenoxy, p-aminophenoxy, p-trifluoromethylphenoxy, etc.

When $R_1$, in compounds of the Formula I is aryl or aryl lower alkyl, the preferred form of the compound of Formula I has the formula:

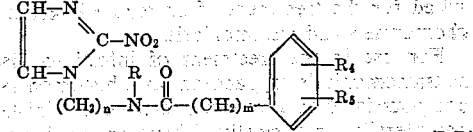

wherein R, $R_4$, $R_5$ and $n$ are as above, and $m$ is an integer of from 0 to 6.

In a preferred embodiment of compounds of the Formula I–B, R is hydrogen, and m is an integer from 0 to 4. Among the preferred phenyl substituents in the compound of Formula I–B are included phenyl, p-chlorophenyl, o-chlorophenyl, o,p-dichlorophenyl, p-methylphenyl, p-ethylphenyl, o-methoxyphenyl, o-nitrophenyl, p-aminophenyl, p-trifluoromethylphenyl, etc.

When $R_1$, in compounds of the Formula I is a substituted or unsubstituted heterocyclic aromatic ring moiety, the preferred form of the compound of Formula I has the formula:

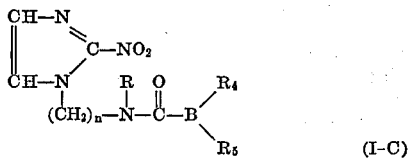

(I-C)

wherein R, $R_4$, $R_5$ and n are as above, and B is a 5 or 6 membered aromatic heterocyclic ring moiety containing from 1 to 2 hetero atoms selected from the group consisting of nitrogen, oxygen or sulfur.

In accordance with a preferred embodiment of Formula I–C, R is hydrogen and n is an integer from 2 to 4. Among the preferred heterocyclic moieties which can constitute B are included, pyridyl, e.g., 3-pyridyl and 5-pyridyl, furanyl, thiofuranyl, pyrrolyl, imidazolyl, thienyl, pyrimidyl, e.g., 5-pyrimidyl, pyrazinyl and the like.

When $R_2$ and $R_3$, in the compound of Formula II form a 5 or 6 membered heterocyclic, a preferred form of the compound of Formula II has the formula:

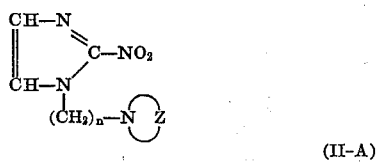

(II-A)

wherein n is as above, and Z represents lower alkylene, loweralkylene-azalower alkylene, N-loweralkyl-loweralkylene - azaloweralkylene, loweralkylene-oxaloweralkylene or loweralkylene-thialoweralkylene so as to form with the nitrogen atom to which they are attached a 5 or 6 membered nitrogen heterocycle.

Hence, Z includes such radicals as pentamethylene, tetramethylene, ethyleneoxyethylene and ethyleneazaethylene, which can be substituted or unsubstituted. Among the preferred heterocyclic moieties formed by N and Z are included, N-lower alkyl piperazinyl, pyrrolidinyl, piperazinyl, morpholinyl and piperidinyl.

The compounds of Formulae I and II as well as their acid addition salts with pharmaceuticaly acceptable acids are useful as anti-microbial agents. They are particularly useful against bacteria such as *Klebsiella pneumoniae*, *Salmonella schottmuelleri*, *Salmonella typhi*, *Staphylococcus aureus*, *Streptococcus hemolyticus* and the like. They are also particularly useful in combatting protozoa such as *Trichomonas vaginalis*, *Trichomonas foetus*, *Histomonas meleagradis*, *Endamoeba histolytica*, Trypanosomes, e.g., *T. cruzi*, *T. rhodesiense*, *T. congolense*, and the like. Therefore, the compounds of this invention can be used as germicides, and anti-protozoal agents, e.g. trichomonacides, histomonacides, trypanacides.

Compounds of Formulae I and II are particularly well suited for the treatment of protozoal infections, e.g., trichomoniasis and histomoniasis.

For use in the treatment of infectious diseases such as trichomoniasis, trypanosomiasis, histomoniasis, etc., the compounds of this invention can be administered orally, parenterally or topically. They can be formulated into conventional pharmaceutical dosage forms in admixtures with organic or inorganic inert carrier materials which are suitable for enteral, parenteral or topical application such as, for example, water, gelatin, lactose, starch, magnesium stearate, talc, vegetable oil, gum arabic, polyalkylene glycols, Vaseline, etc., or other conventional excipients. They can be prepared in the form of tablets, dragées, suppositories, capsules, ointments, creams, etc., or in liquid form such as solutions, suspensions, emulsions and the like. They can contain other additives such as preserving, stabilizing, wetting or emulsifying agents, salts for varying the osmotic pressure, buffers and the like or they can be formulated with other therapeutically useful materials. Typical oral dosages of the novel compounds of this invention and their salts range from about 30 to about 100 mg./kg. animal body weight though higher or lower dosages adjusted to species and individual requirements may also be used.

The fact that the compounds of Formulae I and II above are effective in combatting trichomoniasis can be seen from various in vivo tests in mice using standard testing procedures. For instance, amides such as N-[2-(2-nitro-1-imidazolyl)ethyl]propionamide, N-[2 - (2 - nitro-1-imidazolyl)ethyl]trifluoroacetamide, N-[3-(2 - nitro - 1 - imidazolyl)propyl]trifluoroacetamide hydrate have been found to be active in in vivo against *Trichomonas vaginalis* in mice at dosages of from 26 mg./kg. p.o. to 60 mg./kg. p.o., and higher, whereas all of these compounds have $LD_{50}$'s of greater than 500 mg./kg. p.o. in mice. Another example of the effectiveness of the compounds of Formulae I and II can be seen by the fact that compounds such as 4[2-(2-nitro - 1 - imidazolyl)ethyl]morpholine, N - [2- (2 - nitro - 1 - imidazolyl)ethyl]propionamide, N - [3- (2-nitro-1-imidazolyl)propyl]trifluoroacetamide hydrate, and N-[2-(2-nitro - 1 - imidazolyl)ethyl]benzamide have been found to be active in vivo in mice against *Trichomonas foetus* at dosages of from 4 mg./kg. p.o. to 50 mg./kg. p.o. and higher while these compounds have $LD_{50}$'s in mice of greater than 500 mg. p.o.

The effectiveness of the amines of Formula II can be seen by the fact that compounds such as 1-(2-aminoethyl)-2-nitroimidazole and 1-[2-(2-nitro-1-imidazolyl)ethyl]-4-methylpiperazine, have been found to be active in vivo against *Trichomonas vaginalis* in mice at dosages of from 30 to 75 mg./kg. p.o., while these compounds have $LD_{50}$'s in mice of greater than 500 mg./kg. p.o.

Acid addition salts of the novel compounds of this invention i.e., the compounds of Formulae I and II above, are prepared by reacting with inorganic acids such as hydrochloric acid, hydrobromic acid, sulfuric acid, etc., or with organic acids such as oxalic acid, acetic acid, lactic acid, tartaric acid and the like. Non-pharmaceutically acceptable acid addition salts can be converted into pharmaceutically acceptable acid addition salts by neutralization followed by reaction with a suitable pharmaceutically acceptable acid.

The compound of Formula III above is formed by reacting the hydrohalide salt of a compound of the formula:

(V)

wherein X, R and n are as above, with an acid halide of the formula:

(VI)

wherein $X_1$ is a halogen and $R_1$ is as above.

The compound of Formula V is reacted with the compound of Formula VI to produce the compound of the Formula III above in the presence of an inorganic alkali metal base. Generally, this reaction is carried out in an aqueous medium. In carrying out this reaction, any conventional alkali metal base such as sodium hydroxide or potassium hydroxide can be utilized. Furthermore, in carrying out this reaction, it is preferred to utilize at least 2 moles of the base per mole of the hydrohalide salt of Formula V above. Generally, from about 2 to 5 moles of the base are utilized per mole of the compound of Formula V above. This reaction is carried out at reduced temperatures, i.e., temperatures of from about —20° C. to 0° C. However, this reaction can take place at any temperature of from about —40° C. to about 20° C.

The reaction of a 2-nitroimidazole with a compound of Formula III or a compound of Formula IV is preferably carried out by employing an alkali metal salt of 2-nitroimidazole. The alkali metal salt of 2-nitroimidazole can be conveniently prepared by dissolving the 2-nitroimidazole starting material in an alkali metal lower alkoxide, e.g., sodium methoxide, potassium methoxide, etc. The reaction of the alkali metal salt of the 2-nitroimidazole with the compound of the Formula III above or IV is suitably carried out in the presence of an inert organic solvent. Any conventional inert organic solvent can be utilized. Among the preferred inert organic solvents are included, N,N - dimethyl-formamide, N,N - dimethyl-acetamide, dimethyl-sulfoxide, lower alkanols, e.g., methanol, ethanol, etc., hydrocarbon solvents such as toluene, etc. Alternatively, where one of the reactants is a liquid, the reaction can be carried out in the absence of any solvent. This reaction is suitably carried out at an elevated temperature, preferably in the range of about 90° C. to about 160° C.

When $R_2$ is lower alkyl or hydrogen and $R_3$ is hydrogen in the compound of Formula II above, the compound of Formula II above has the following formula:

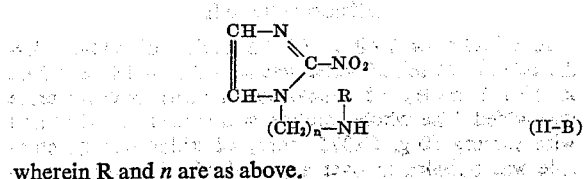

wherein R and n are as above.

The compound of Formula II–B can be converted in accordance with an embodiment of this invention into the compound of Formula I above by reacting the compound of Formula II–B with an acid of the formula:

$$R_1-\overset{O}{\underset{\|}{C}}-OH \qquad (IV)$$

wherein $R_1$ is as above, in the presence of a dehydrating agent. Any conventional dehydrating agent can be utilized in carrying out this reaction. Among the conventional dehydrating agents, the dilower alkyl or dicyclo alkyl carbodimides wherein the cycloalkyl group contains from 3 to 7 carbon atoms such as dicyclohexyl carbodimide are preferred. This reaction can be carried out in an organic solvent under anhydrous conditions. Any conventional inert organic solvent such as the solvents hereinbefore mentioned, can be utilized in carrying out this reaction. Generally, this reaction is carried out at reduced temperatures, i.e., temperatures from about —20° C. to 0° C. However, any temperature of from about —40° C. to about 400 C. can be utilized in carrying out this section.

In accordance with another embodiment of this invention, the compound of the Formula II–B wherein n is 2 and R is hydrogen can be prepared by reacting 2-nitroimidazole with ethyleneimine. This reaction is carried out in excess ethyleneimine. In this reaction excess ethyleneimine acts as the solvent medium. This reaction is simply carried out by mixing the ethyleneimine and the 2-nitroimidazole. Since this reaction is exothermic in nature, the mixing step is best carried out at low temperatures, i.e., from about —20° C. to about 0° C. However, any temperature from about —40° C. to about 10° C. can be utilized in carrying out the mixing step. Once the ethyleneimine and the 2-nitroimidazole are mixed, cooling is stopped and the temperature of the reaction medium is raised to the reflux temperature by means of the heat generated by the reaction. If the temperature of the reaction is raised to a very high level by reason of the heat generated by the reaction medium, the temperature of the reaction can be modified by external cooling.

This invention will be more fully understood from the following examples which are intended to illustrate the invention and are not to be construed to be limitative thereof. All temperatures are stated in degrees centigrade. Where a vacuum is utilized the pressure is stated in mm. Hg.

EXAMPLE 1

Preparation of N-[2-(2-nitro-1-imidazolyl)ethyl] acetamide

A solution of 70.5 g. (1.76 moles) of sodium hydroxide in 400 ml. of water was cooled to —15° and 90.0 g. (0.775 mole) of 2-chloroethylamine hydrochloride was added and the solution was cooled to —18° and 50 ml. (den. 1.10, 55.3 g., 0.705 mole) of acetyl chloride was added dropwise with stirring over a period of 22 minutes maintaining the temperature at —18° to —5°. The mixture was stirred in the cold for an additional 15 minutes, the pH was adjusted to 6 with 19 ml. of glacial acetic acid, the solution was saturated with sodium chloride and extracted with 2 times 1 liter of chloroform. The chloroform extracts were combined, dried over anhydrous magnesium sulfate, filtered and the chloroform removed in vacuo to leave N-(2-chloroethyl) acetamide as a yellow oil.

A solution of 10.0 g. (88.4 mmoles) of sublimed 2-nitroimidazole, 100 ml. of dimethylformamide and 19.2 ml. of 4.56 N solution of sodium methoxide in methanol was made yellow by the addition of a pinch of 2-nitroimidazole and was heated to 152° and then cooled to 120°. With stirring 13.06 g. (11.0 ml., den. 1.19, 107 mmoles) of N-(2-chloroethyl)acetamide was added and the mixture was stirred at 120–130° for one hour. The mixture was cooled and filtered. The solid was slurried in 15 ml. of water and filtered. There remained insoluble crude product, M.P. 164.5–166.5°. The dimethylformamide filtrate was evaporated in vacuo (0.3 mm., bath 52°) to give the solid which was slurried in 25 ml. of absolute ethanol, filtered, washed with 2 times 10 ml. of ethanol and dried. This plus the product from the salt was ground thoroughly with a mixture of 60 ml. of saturated aqueous sodium carbonate solution plus 75 ml. of water, filtered and washed with 25 ml. of water and dried. Evaporation of the aqueous sodium carbonate solution to about 45 ml. in a shallow dish gave additional product. The combined crude product was recrystallized from 185 ml. of boiling absolute ethanol to give pale yellow crystals of N-[2-(2-nitro-1-imidazolyl)ethyl]acetamide, M.P. 165–166°.

$$\lambda_{max.}^{iPrOH}=315\ m\mu,\ \epsilon=7800$$

EXAMPLE 2

Preparation of N-[2-(2-nitro-1-imidazolyl)ethyl] benzamide

A solution of 41.6 g. (1.04 moles) of sodium hydroxide in 250 ml. of water was cooled to —15° and 55.5 g. (0.478 mole) of 2-chloroethylamine hydrochloride was added and the solution cooled to insipient freezing and 50 ml. (den. 1.22, 61.0 g., 0.435 mole) of benzoyl chloride was added dropwise over a period of 27 min. The mixture was stirred in the cold for 5 minutes, the pH was adjusted to 6 with 9 ml. of glacial acetic acid, and the solid was filtered and washed with 6 times 10 ml. of water. The filter cake was sucked dry and dissolved in 150 ml. boiling ethanol. The solution was cooled in the freezer to give N-(2-chloroethyl)benzamide.

A stirred solution of 10.3 g. of sublimed 2-nitroimidazole in 19.4 ml. (88.5 mmoles) of 4.56 N solution of sodium methoxide in methanol plus 100 ml. of dimethylformamide was made yellow by the addition of a small amount of 2-nitroimidazole and was heated to 152°, cooled to 118° and 19.5 g. (106 mmoles) of N-(2-chloroethyl)benzamide was added. The mixture was stirred at reflux (154°) for 30 minutes, cooled to 10°, the sodium chloride filtered and the dimethylformamide removed in vacuo (0.4 mm., bath 50°) to give a brown solid. This was ground with 30 ml. of absolute ethanol, filtered, washed with 2 times 7.5 ml. of ethanol and dried. It was shaken with a mixture of 600 ml. of ethyl acetate plus 40 ml. of saturated aqueous sodium carbonate solution plus 10 ml. of water. The ethyl acetate layer was washed with 2 times 20 ml. of water, dried over anhydrous magnesium sulfate, filtered and the filtrate evaporated to give crystalline solid. This was recrystallized from 100 ml. of boiling absolute ethanol (Norit A) to give needles of N-[2-(2-nitro-1-imidazolyl)ethyl]benzamide, M.P. 140.5–141.5°.

$$\lambda_{max.}^{iPrOH} = 314 \text{ m}\mu, \epsilon = 8100$$

EXAMPLE 3

Preparation of N-[2-(2-nitro-1-imidazolyl)ethyl] phenylacetamide

To a solution of 36.6 g. (0.904 mole) of sodium hydroxide in 225 ml. of water at −15° was added 48.0 g. (0.413 mole) of 2-chloroethylamine hydrochloride and the whole was cooled to −20° and with stirring 50 ml. (den. 1.16, 58.0 g., 0.376 mole) of phenylacetyl chloride was added dropwise over a period of 11 minutes maintaining the temperature in the range of −20° to −10°. The mixture was stirred in the cold for 30 minutes, the pH adjusted to 6 with 10 ml. of glacial acetic acid and the solid was filtered, washed with 4 times 20 ml. of water, sucked dry and dissolved in 100 ml. of boiling ethanol. The solution was cooled in the freezer to give N-(2-chloroethyl)phenylacetamide.

A solution of 10.3 g. of sublimed 2-nitroimidazole in 100 ml. of dimethylformamide plus 19.4 ml. (88.5 mmoles) of 4.65 N solution of sodium methoxide in methanol was made yellow by the addition of a small amount of 2-nitroimidazole, heated to 153° and cooled to 130°. With stirring 21.9 g. (110.4 mmoles) of N-(2-chloroethyl)phenylacetamide was added and the mixture stirred at 129–139° for 40 minutes and then cooled to 10°. The sodium chloride was filtered and the dimethylformamide was removed in vacuo (0.3 mm., bath 60°) to give a tan solid plus oil which was shaken while warm with 30 ml. of absolute ethanol, cooled and filtered and the solid washed with 2 times 10 ml. of ethanol and dried. This was shaken with 800 ml. of ethyl acetate plus 50 ml. of saturated aqueous sodium carbonate solution plus 12 ml. of water, the layers separated and the ethyl acetate washed with 2 times 30 ml. of water, dried over anhydrous magnesium sulfate, filtered and the filtrate let evaporate to give crystalline solid. This was recrystallized from 125 ml. of boiling absolute ethanol (Norit A) to give N-[2-(2-nitro-1-imidazolyl)ethyl]phenylacetamide as crystals, M.P. 125.5–127°.

$$\lambda_{max.}^{iPrOH} = 316 \text{ m}\mu, \epsilon = 8000$$

EXAMPLE 4

Preparation of N-[2-(2-nitro-1-imidazolyl)ethyl] propionamide

A solution of 55.2 g. (1.38 moles) of sodium hydroxide in 300 ml. of water was cooled to 5° and 73.7 g. (0.633 mole) of 2-chloroethylamine hydrochloride was added and the solution cooled to −18° and 50 ml. (den. 1.06, 53.2 g., 0.575 mole) of propionyl chloride was added dropwise with stirring over a period of 17 minutes maintaining the temperature at −18 to −12°. The mixture was stirred in the cold for an additional 18 minutes, 60 g. of sodium chloride was added and the pH was adjusted to 6 with 15 ml. of glacial acetic acid. The solid present melted just above 0° and was extracted out with 2 times 500 ml. of chloroform. The chloroform extracts were combined, dried over anhydrous magnesium sulfate, filtered and the chloroform removed in vacuo to give 69 g. of N-(2-chloroethyl)propionamide as a light yellow oil.

A solution of 12.5 g. of sublimed 2-nitroimidazole in 100 ml. dimethylformamide plus 23.5 ml. (107 mmoles) of 4.56 N solution of sodium methoxide in methanol was made light yellow by the addition of a small amount of 2-nitroimidazole and was heated to 153° and let cool to 122°. Then 18.4 g. (136 mmoles) of N-(2-chloroethyl)propionamide was added and the mixture was stirred at 125–135° for 45 minutes, cooled to 12°, the sodium chloride filtered and the dimethylformamide removed in vacuo (0.3 mm., bath 62°) to give an oil which partially solidified. This was slurried in 5 ml. of absolute ethanol, filtered and washed with 2 times 2.5 ml. of ethanol and dried. This was shaken with a mixture of 500 ml. of ethyl acetate plus 45 ml. of saturated aqueous sodium carbonate solution plus 10 ml. of distilled water. The ethyl acetate layer was washed with 2 times 15 ml. of water dried over anhydrous magnesium sulfate, filtered and the filtrate allowed to evaporate in a shallow dish to give crystals. These were dissolved in 30 ml. of boiling absolute ethanol and the solution cooled in the freezer to give N-[2-(2-nitro-1-imidazolyl)ethyl]propionamide as pale yellow crystals, M.P. 95.5–97.5°.

$$\lambda_{max.}^{iPrOH} = 315 \text{ m}\mu, \epsilon = 7700$$

EXAMPLE 5

Preparation of N-[2-(2-nitro-1-imidazolyl)ethyl] trifluoroacetamide

A solution of 29.0 g. (0.725 mole) of sodium hydroxide in 175 ml. of water was cooled to −18° and 39.0 g. (0.336 mole) of 2-chloroethylamine hydrochloride was added. The whole solution was cooled to −18° and with stirring 50 g. (0.375 mole) of trifluoroacetyl chloride was bubbled in over a period of 17 minutes maintaining the temperature at −18 to −10°. The pH at the end of the addition was 8. The mixture was stirred in the cold for 20 minutes, the pH was adjusted to 7 with 6 ml. of glacial acetic acid and the solid was filtered, washed with 3 times 20 ml. of cold water and dried to give N-(2-chloroethyl)trifluoroacetamide.

A solution of 10.5 g. (93.0 mmoles) of 2-nitroimidazole in 100 ml. of dimethylformamide plus 21.0 ml. of 4.56 N solution of sodium methoxide in methanol was heated to 152°, cooled to 130° and 18.5 g. (106 mmoles) of N-(2-chloroethyl)trifluoroacetamide was added. The mixture was stirred at 129–134° for 1.5 hours, cooled, the sodium chloride filtered and the dimethylformamide removed in vacuo (0.3 mm., bath 56°). The resulting solid was slurried in 125 ml. of ethanol, cooled, filtered, washed with 15 ml. of ethanol and dried. It was shaken with a mixture of 750 ml. of ethyl acetate plus 60 ml. of saturated aqueous sodium carbonate solution plus 15 ml. of water. The ethyl acetate layer was extracted with 3 times 15 ml. of water, dried over anhydrous magnesium sulfate, filtered and the filtrate allowed to evaporate to give tan crystals which were recrystallized from 125 ml. of boiling absolute ethanol to give N-[2-(2-nitro-1-imidazolyl)ethyl] - trifluoroacetamide as pale yellow flakelet crystals, M.P. 145–146°.

$$\lambda_{max.}^{iPrOH} = 313 \text{ m}\mu, \epsilon = 7600$$

EXAMPLE 6

Preparation of N-[3-(2-nitro-1-imidazolyl)propyl] trifluoroacetamide hydrate

A solution of 29.0 g. (0.725 mole) of sodium hydroxide in 175 ml. of water was cooled to −18° and 72.8 g. (0.332 mole) of 3-bromo-propylamine hydrobromide was added and cooled to −17°, and with stirring 49 g. (0.37 mole) of trifluoroacetyl fluoride was bubbled in over a period of 24 minutes maintaining the temperature in the range of −12 to −8°. The pH at the end was 9. The mixture was stirred in the cold for an additional 20 minutes and the pH was adjusted to 6 with 8 ml. of glacial acetic acid. The solid was filtered, washed with 3 times 15 ml. of cold water and dried to give N-(3-bromopropyl)trifluoroacetamide.

An orange solution of 10.3 g. of sublimed 2-nitroimidazole in 100 ml. of dimethylformamide plus 19.65 ml. (89.5 mmoles) of 4.56 N solution of sodium methoxide in methanol was made light yellow by the addition of a small amount of 2-nitroimidazole. The solution was heated to 152°, cooled to 135° and 23.6 g. (102 mmoles) of N-(3-bromopropyl)trifluoroacetamide was added and the mixture was stirred at 125–130° for 35 minutes. The dimethylformamide was removed in vacuo (0.2 mm., bath 60°) and the pasty residue was stirred with 100 ml. of chloroform, the sodium bromide filtered and the filtrate evaporated in vacuo to give an amber oil. This was shaken with 200 ml. of ethyl acetate plus 20 ml. of saturated aqueous sodium carbonate solution plus 5 ml. of water. The ethyl acetate layer was washed with 7.5 ml. of water, dried over anhydrous magnesium sulfate, filtered and the filtrate allowed to evaporate in a shallow dish. The oil which formed was slurried in 25 ml. of absolute ethanol, and the solution allowed to evaporate slowly to give crystals. After several hours these were slurried in 5 ml. of absolute ethanol, filtered, washed with 3 ml. of ethanol and dried. The ethanol filtrate plus wash was allowed to evaporate to give more crystals which were slurried in 5 ml. of chloroform, filtered, washed with 3 ml. of chloroform and dried. They were recrystallized from 10 ml. of ethanol to give N-[3-(2-nitro-1-imidazolyl)propyl] trifluoroacetamide hydrate as crystals, M.P. 57–59°.

$$\lambda_{max.}^{iPrOH} = 313 \text{ m}\mu, \epsilon = 7800$$

EXAMPLE 7

Preparation of N-[3-(2-nitro-1-imidazolyl)propyl]acetamide

A solution of 32 g. (0.8 mole) of sodium hydroxide in 200 ml. of water was cooled to −18° and 80.0 g. (0.365 mole) of 3-bromopropylamine hydrobromide was added and the whole was cooled to −16° and 24.5 ml. (den. 1.10, 27.0 g., 0.344 mole) of acetyl chloride was added dropwise with stirring over a period of 10 minutes maintaining the temperature between −16° and 0°. The mixture was stirred in the cold for 20 minutes, the pH was adjusted to 6 with 7 ml. of glacial acetic acid and the murky mixture was extracted with 2 times 500 ml. of chloroform. The chloroform extracts were combined, dried over anhydrous magnesium sulfate, filtered and the chloroform removed in vacuo. The resulting oily N-(3-bromopropyl)acetamide crystallized on standing at room temperature.

An orange solution of 10.3 g. of sublimed 2-nitroimidazole in 100 ml. of dimethylformamide plus 19.6 ml. (89.5 mmoles) of 4.56 N solution of sodium methoxide in methanol was made light yellow by the addition of a small amount of 2-nitroimidazole. The solution was heated to 152°, cooled to 120° and 20.0 g. (111 mmoles) of N-(3-bromopropyl)acetamide was added and the mixture stirred at 125–133° for 45 minutes. The dimethylformamide was removed in vacuo and the resulting oil was shaken with 125 ml. of chloroform, the sodium bromide was filtered and the filtrate was concentrated in vacuo to an amber oil. This was shaken with a mixture of 450 ml. of ethyl acetate plus 40 ml. of saturated aqueous sodium carbonate solution plus 6 ml. of water. The ethyl acetate layer was washed with 8 ml. of water and was then dried over anhydrous magnesium sulfate, filtered and allowed to evaporate in a shallow dish to give a yellow, moist crystalline solid. This was sucked dry on a small Büchner funnel, washed with 2 ml. of absolute ethanol and dried. It was recrystallized from 45 ml. of hot water to give N-[3-(2-nitro-1-imidazolyl)propyl]acetamide as crystals, M.P. 65.5–67°.

$$\lambda_{max.}^{iPrOH} = 313 \text{ m}\mu, \epsilon = 7300$$

A sample was recrystallized twice again from water, M.P. 67.5–68.5°.

EXAMPLE 8

Preparation of β-(2-nitro-1-imidazolyl)ethyldiethylamine

To a stirred slurry of 5.00 g. (44.2 mmoles) of powdered and sieved sublimed 2-nitroimidazole and 8.35 g. (48.6 mmoles) of β-chloroethyl diethylamine hydrochloride in 50 ml. of dimethylformamide was added 21.0 ml. of 4.44 N solution of sodium methoxide in methanol. Sodium chloride precipitated and the slurry became pink. A pinch of azomycin was added and the slurry became yellow. The sodium chloride was filtered and to the filtrate was added 1.05 g. of sodium iodide and the mixture was stirred and heated at 103–119° for 30 minutes, cooled, the salt removed by filtration and the filtrate evaporated to an amber oil in vacuo (oil pump). On cooling, the oil partially solidified and the slush was shaken with 75 ml. of carbon tetrachloride and filtered. The filtrate was evaporated to give a moist solid which was dissolved in 20 ml. of benzene at room temperature and ∼20 ml. of hexane was added and the solution was warmed to ∼35° and about 1 g. of Norit A was added and filtered. The filtrate was warmed slightly and hexane was added until the solution just became hazy and then a few drops of benzene was added to give a clear solution. This solution was cooled in the freezer to give β-(2-nitro-1-imidazolyl)ethyldiethylamine as yellow flakelets, M.P. 54–55°.

$$\lambda_{max.}^{EtOH} = 314 \text{ m}\mu$$

EXAMPLE 9

Preparation of 4-[2-(2-nitro-1-imidazolyl)ethyl]morpholine

To a stirred mixture of 10.0 g. (88.4 mmoles) of sublimed 2-nitroimidazole, 17.4 g. (93.5 mmoles) of N-(β-chloroethyl)morpholine hydrochloride and 100 ml. of dimethylformamide was added very slowly 39.5 ml. of 4.56 N solution of sodium methoxide in methanol. The sodium chloride was filtered, 1.0 g. sodium iodide was added and the solution was stirred at 107–119° for 30 minutes. The mixture was cooled to 15°, the sodium chloride filtered and the dimethylformamide removed in vacuo (0.3 mm., bath 45°). The residue was shaken with a mixture of 350 ml. of ethyl acetate plus 60 ml. of saturated aqueous sodium carbonate solution plus 30 ml. of water. The layers were separated and the ethyl acetate was extracted first with 25 ml. of saturated aqueous sodium carbonate solution plus 15 ml. of water and finally with 35 ml. of water. The ethyl acetate solution was allowed to evaporate to give crystals which were recrystallized from 40 ml. of warm absolute ethanol to give 4-[2-(2-nitro-1-imidazolyl)ethyl]morpholine as lath shaped crystals, M.P. 56–58°.

$$\lambda_{max.}^{iPrOH} = 313 \text{ m}\mu, \epsilon = 6400$$

EXAMPLE 10

Preparation of N-[2-(2-nitro-1-imidazolyl)ethyl]piperidine

To a stirred mixture of 10.0 g. (88.4 mmoles) of sublimed 2-nitroimidazole, 18.0 g. (97.5 mmoles) of N-(β-chloroethyl)piperidine hydrochloride and 100 ml. of dimethylformamide was added very slowly 42.0 ml. of 4.56 N solution of sodium methoxide in methanol. The sodium chloride was filtered, 1.0 g. sodium iodide was added and the solution was stirred at 105–18° for 50 minutes. The mixture was cooled, the sodium chloride was filtered and the dimethylformamide removed in vacuo (0.2 mm., bath 52°) to give an amber oil. This was dissolved in absolute ethanol and the ethanol let evaporate and this process repeated until the oil became crystalline. The crystals were slurried in 8 ml. of absolute ethanol, filtered, and washed with 2 times 6 ml. of absolute ethanol to give product, M.P. 63.5–66°. This was recrystallized from 50 ml. of boiling absolute ethanol (Norit A) to give N-[2-(2-nitro-1-imidazolyl)ethyl]piperidine as light yellow rods, M.P. 66–68°.

$$\lambda_{max.}^{iPrOH} = 313 \text{ m}\mu, \epsilon = 6200$$

EXAMPLE 11

Preparation of N-[2-(2-nitro-1-imidazolyl)ethyl]-2-nitro-5-furoamide

To a cold solution of 1.6 g. (7.7 mmoles) of dicyclohexylcarbodiimide in 100 ml. of dry ethyl acetate was added a mixture of 1.06 g. (6.5 mmoles) of 2-nitro-5-furoic acid and 1.05 g. (6.5 mmoles) of 1-(2-aminoethyl)-2-nitroimidazole (described herein) with stirring. The mixture was stirred in an ice bath for 1 hour and was then stirred at room temperature overnight. The solid which formed was filtered, washed with ethyl acetate, acid dried, wt. 2 g. This was stirred with 200 ml. of absolute ethanol at room temperature which dissolved 1.4 g. of dicyclohexylurea. The remaining 0.7 g. of solid was recrystallized from 125 ml. of boiling absolute ethanol to give N - [2-(2-nitro-1-imidazolyl)ethyl] - 2-nitro-5-furoamide, M.P. 173–175°. The ethyl acetate filtrate from the 2.1 g. of solid was extracted and saturated NaCl solution. The ethyl acetate layer was filtered, the filtrate was evaporated to dryness, and the resulting solid was recrystallized from 125 ml. of boiling absolute ethanol to give additional N - [2-(2-nitro-1-imidazolyl)ethyl] - 2-nitro-5-furoamide, M.P. 172.5–173.5°.

EXAMPLE 12

Preparation of N-[2-(2-nitro-1-imidazolyl)ethyl]-anisamide

A solution of 17.6 g. of NaOH in 160 ml. of water was cooled below 0° and 23.2 g. of 2-chloroethylamine hydrochloride was added. Acetone (200 ml.) was cooled to −20° and 34.1 g. of anisoylchloride was added. To this stirred solution at −19° the aqueous solution of

was added slowly over a period of 5 minutes, the maximum temperature being 10°. The slurry was stirred at 0 to 10° for 25 minutes and 120 ml. of water was added. The slurry was cooled to −8°, filtered, and the solid was washed with water and sucked as dry as possible. The slightly moist solid was recrystallized from 125 ml. of boiling absolute ethanol to give 24.0 g. of N-(2-chloroethyl)anisamide, M.P. 125.5–127°.

A mixture of 10.0 g. of sublimed 2-nitroimidazole plus 100 ml. of dimethylformamide (D.M.F.) was stirred and 19.6 ml. of 4.56 N sodium methoxide in methanol was added. The mixture was heated to 152°, cooled to 125°, and 21.8 g. of N-(2-chloroethyl)anisamide was added. The mixture was heated with stirring at 120–130° for 40 minutes. The D.M.F. was removed in vacuo and the residue was shaken with a mixture of 2 l. of ethylacetate plus 50 ml. of saturated aqueous Na₂CO₃ solution plus 100 ml. of water, filtered, and the layers separated. The ethyl acetate layer was washed with 75 ml. of saturated salt solution, dried, and the ethyl acetate removed until a volume of about 75 ml. was reached. The slurry was cooled and the solid was filtered, washed with cold ethanol, and dried, wt. 14.7 g. This was recrystallized from 350 ml. of boiling absolute ethanol (charcoal) to give N - [2-(nitro-1-imidazolyl)ethyl]anisamide, M.P. 165.7–166.7°.

EXAMPLE 13

Preparation of N-[2-(2-nitro-1-imidazolyl)ethyl]-p-chlorophenoxyacetamide

A mixture of 37.4 g. of p-chlorophenoxyacetic acid and 56 g. of thionychloride was refluxed for one hour and the excess thionyl chloride was removed in vacuo. The crude p-chlorophenoxy-acetyl chloride was dissolved in 200 ml. of acetone, the solution cooled to −20°, and then with stirring a cold solution prepared from 170 ml. of water, 19.6 g. of NaOH, and 23.2 g. of 2-chloroethylamino hydrochloride was added slowly over a period of 6 minutes maintaining the temperature below 10°. To the resulting clear solution was added about 125 ml. of water whereupon a crystalline solid formed. The slurry was cooled to −6°, filtered, washed with water, stirred with 200 ml. of 1 N NaOH solution for 10 minutes, refiltered, washed thoroughly with water, dried, and recrystallized from 36 ml. of boiling absolute ethanol to give N-(2-chloroethoxy)-p-chlorophenoxyacetamide, M.P. 94.5–95.5°.

A mixture of 6.7 g. of 2-nitroimidazole plus 70 ml. of dimethylformamide (D.M.F.) was stirred and 13.1 ml. of 4.56 N sodium methoxide in methanol was added. The solution was heated to 152°, cooled to 130° and 14.7 g. of N-(2-chloroethyl) - p - chlorophenoxyacetamide was added and the mixture was heated at 120–130° for 40 minutes. The D.M.F. was removed in vacuo and the residue was shaken with a mixture of 250 ml. of ethyl acetate, 25 ml. of water and 20 ml. of saturated aqueous sodium carbonate solution. The ethyl acetate layer was washed with 25 ml. of saturated NaCl solution and the ethyl acetate was removed in vacuo to give a moist solid which was slurried in 35 ml. of ethanol, filtered, washed with ethanol, and dried. This solid was recrystallized from 225 ml. of boiling ethanol (charcoal) to give N-[2-(2-nitro-1-imidazolyl)ethyl]-p - chlorophenoxy-acetamide, M.P. 137.7–138.7°.

$$\lambda_{max.}^{iPrOH} \text{ 287 m}\mu, \epsilon = 5400 \text{ and } 313 \text{ m}\mu, \epsilon = 7900$$

EXAMPLE 14

Preparation of N-[2-(2-nitro-1-imidazolyl)ethyl]-2-nitro-5-furoamide

To a solution of 1.64 g. (41 mmoles) of NaOH in 10 ml. of water there was added 2.2 g. (19 mmoles) of 2-chloroethylamine hydrochloride. The mixture was cooled to −10° and 2.91 g. (17 mmoles) of 2-nitro-5-furoyl chloride was added in small portions with stirring over a period of 20 min. The mixture was stirred in the cold for several hours and the tan solid which formed was filtered off, washed and dried. It was recrystallized from hot ethanol to give N-(2-chloroethyl)-2-nitro-5-furoamide.

A solution of 0.52 g. (4.6 mmoles) of sublimed 2-nitroimidazole in 15 ml. of dimethylformamide plus 1.0 ml. of 4.56 N sodium methoxide in methanol was heated to 152°, cooled to 100° and 2.0 g. (9.2 mmoles) of N-(2-chloroethyl)-2-nitro-5-furoamide was added. The mixture was stirred at 120–150° for 1 hr. The dimethylformamide was removed in vacuo, and the residual solid was shaken with a mixture of 5 ml. of water, 5 ml. of saturated aqueous Na₂CO₃ solution and 100 ml. of ethylacetate. The layers were separated, and the ethylacetate was washed with 25 ml. of water, and evaporated. The resulting solid was leached with 15 ml. of ethanol at room temperature and the insoluble material was recrystallized three times from ethanol to give N-[2-(2-nitro-1-imidazolyl)ethyl]-2-nitro-5-furoamide as crystals, M.P. 171–173°.

EXAMPLE 15

Preparation of 1-[2-(2-nitro-1-imidazolyl)ethyl]-4-methylpiperazine

A solution of 1.58 g. (14 mmoles) of sublimed 2-nitroimidazole in 3.01 ml. of 4.56 N sodium methoxide in methanol plus 25 ml. of dimethylformamide was heated to 152°, cooled to 105°. 2.53 g. (15.6 mmoles) of 1-(2-chloroethyl)-4-methylpiperazine (J. C. Craig, R. J. Harrison, M. E. Tate, R. H. Thorp, and R. Ladd, Australian Journal of Chemistry, 9, 89–94 (1956)) was added and the mixture was heated at 95–105° for 50 min. The solvent was removed in vacuo and the residual oil was shaken with a mixture of 14 ml. of 1 N NaOH plus 100 ml. of ethylacetate. The layers were separated, the aqueous layer extracted with ethylacetate and the combined organic layers extracted with 15 ml. of 1 N NaOH. The organic layer was dried over anhydrous $Na_2CO_3$ and the ethyl acetate was removed in vacuo (100 mm.) to give an oil which was dissolved in 10 ml. of ether which upon cooling gave the product, having melting point 61–63°. Recrystallized from 5 ml. of ether there was obtained 1-[2-(2-nitro-1-imidazolyl)ethyl] - 4 - methylpiperazine as crystals, M.P. 62.5–64°.

EXAMPLE 16

Preparation of 1-(2-aminoethyl)-2-nitroimidazole

Sublimed 2-nitroimidazole (20.0 g., 177 mmoles) was dissolved in 200 ml. of ethyleneimine in a 1,000 ml. flask with three condensers while cooling in an ice bath. The solution was then removed from the ice bath whereupon the reaction mixture spontaneously heated to reflux temperature and refluxed for 30 minutes. The excess ethyleneimine was removed in vacuo (finally 0.3 mm., bath 70°) to give a viscous oil which was cooled and poured into 400 ml. of ice water. The resulting solution was extracted with seven times 500 ml. of chloroform. The combined chloroform extracts were dried over anhydrous sodium sulfate and evaporated to an oil which crystallized. The crystals were slurried in 25 ml. of ether, filtered and washed with ether. The crystals were then recrystallized from 110 ml. of ethyl acetate to give crystals, M.P. 90.5–92°. A second crystallization gave 1-(2-aminoethyl)-2-nitroimidazole, M.P. 91–92°.

EXAMPLE 17

Preparation of N-[2-(2-nitro-1-imidazolyl)ethyl]dichloroacetamide

A suspension of 4.05 g. (26 mmoles) of 1-(2-aminoethyl)-2-nitroimidazole in 20.8 ml. of 10% by weight aqueous sodium hydroxide solution was cooled to —5°. With vigorous stirring 5.73 g. (39 mmoles) of dichloroacetylchloride was added dropwise maintaining the reaction temperature at —10° to 0°. Following completion of the addition of the dichloroacetylchloride, the mixture was allowed to stir in the cold for one hour. The solid was filtered, washed with water, and dried at room temperature. The solid, M.P. 116–118°, was recrystallized from 25 ml. of absolute ethanol to give N-[2-(2-nitro-1-imidazolyl)ethyl]dichloroacetamide as crystals, M.P. 116.5–118.5°.

EXAMPLE 18

Preparation of N-methyl-N-[2-(2-nitro-1-imidazolyl)ethyl]propionamide

A solution of 28.8 g. of sodium hydroxide in 250 ml. of distilled water was cooled to 0° C. and 39.0 g. of methyl aminoethyl chloride hydrochloride was added. The solution was cooled to —10° C. and 32.2 g. of propionyl chloride was added dropwise with stirring at such a rate that the temperature of the reaction mixture was —10° to 0° C. The mixture was then cooled at 0° C. for 30 minutes, and was then extracted with three 250 ml. portions of chloroform. The combined chloroform extracts were dried over $MgSO_4$, filtered, the chloroform removed in vacuo, and the remaining oil distilled to give N-methyl-N-(2-chloroethyl)propionamide, B.P. 58–60°/0.05 to 0.1 mm. Hg.

A solution of 9.6 g. of sublimed 2-nitro-imidazole in 100 ml. of N,N-dimethylformamide plus 20.7 ml. of 4.1 N sodium methoxide in methanol was heated to 152° C., cooled to 135° C. and 14.0 g. of N-methyl-N-(2-chloroethyl)propionamide was added. The mixture was stirred at 120–130° C. for one hour. The dimethyl formamide was removed in vacuo to give an oil which soon crystallized. This solid was shaken in a separatory funnel with a mixture of 500 ml. of ethylacetate plus 25 ml. saturated aqueous $Na_2CO_3$ solution plus 25 ml. of water. The aqueous layer was separated, and the organic layer was extracted with a mixture of 25 ml. of saturated aqueous $Na_2CO_3$ solution plus 25 ml. of water and then with 25 ml. of water. The ethylacetate layer was dried over $Na_2SO_4$, filtered, and concentrated in vacuo to an oily solid. This was washed with 25 ml. of ether to give crude product, M.P. 77–78.5° C. This was recrystallized from 2 parts of boiling absolute ethanol to give N-methyl-N-[2-(2-nitro-1-imidazolyl)ethyl]propionamide, M.P. 77.5–79° C.

EXAMPLE 19

Preparation of N-[2-(2-nitro-1-imidazolyl)ethyl] butyramide

A solution of 19.2 g. of sodium hydroxide in 170 ml. of distilled water was cooled to 0° C. to 22.1 g. and 2-chloroethylamine hydrochloride was added. This solution was cooled to —10° C., and 23.4 g. of butyrylchloride was added dropwise with stirring at such a rate that the reaction temperature was —10° C. to 0° C. A solid formed. The mixture was then cooled at 0° C. for one hour, and was extracted with three 220 ml. portions of ethyl acetate. The combined extracts were dried over $Na_2SO_4$, filtered, and the filtrate evaporated in vacuo to give an oil which was distilled to give N-(2-chloroethyl)butyramide, B.P. 83–83.5°/0.05 to 0.1 mm. which crystallized at room temperature.

A solution of 9.6 g. of sublimed 2-nitroimidazole in 100 ml. of N,N-dimethylformamide plus 20.7 ml. of 4.1 N sodium methoxide in methanol was heated to 152° C., cooled to 140° C. and 14.0 g. of N-(2-chloroethyl)butyramide was added. The mixture was stirred at 120–130° C. for 1.75 hours, and the dimethyl formamide was removed in vacuo. The residual oil plus solids was shaken in a separatory funnel with a mixture of 300 ml. of ethylacetate plus 25 ml. of saturated aqueous $Na_2CO_3$ solution plus 50 ml. of water. The aqueous layer was separated and the organic layer was extracted with a mixture of 15 ml. of saturated $Na_2CO_3$ solution plus 35 ml. of water and then with 25 ml. of water. The ethylacetate layer was dried over $MgSO_4$, filtered, and the filtrate was evaporated in vacuo to solids which were washed with 30 ml. of ether and dried to give 10.2 g. of crude product, M.P. 119–121° C. This was recrystallized from 1 part of boiling absolute ethanol to give N-[2-(2-nitro-1-imidazolyl)ethyl]butyramide, M.P. 119.5–121.5° C.

EXAMPLE 20

Preparation of N-[2-(2-nitro-1-imidazolyl)ethyl] isobutyramide

To a solution of 19.2 g. of sodium hydroxide in 170 ml. of distilled water at 0° C. was added 22.1 g. of 2-chloroethylamine hydrochloride. This solution was cooled to —10° C. and 23.4 g. of isobutyryl chloride was added dropwise with stirring at such a rate that the reaction temperature was maintained at —15 to —10° C. The mixture was then cooled at 0° for 30 minutes and extracted with three times 250 ml. of chloroform. The combined chloroform extracts were dried over $MgSO_4$, filtered, and the filtrate was evaporated in vacuo to an oil. This was distilled to give 19.4 g. of product, B.P. 81–83°/0.05 to 0.1 mm. This solidified and was washed with 20 ml. of petroleum ether, filtered, and dried to give N-(2-chloroethyl) isobutyramide, M.P. 45–48° C.

A solution of 6.6 g. of sublimed 2-nitroimidazole in 70 ml. of N,N-dimethylformamide plus 14.2 ml. of 4.1 N sodium metholate in methanol was heated to 152°, cooled to 100°, and 7.9 g. of N-(2-chloroethyl)isobutyramide was added and the mixture was heated at 120–130° C. for 1.5 hours. The dimethylformamide was removed in vacuo, and the residual oil plus solids was shaken in a separatory funnel with a mixture of 100 ml. of ethylacetate plus 15 ml. of saturated aqueous $Na_2CO_3$ solution plus 15 ml. of water. The aqueous layer was separated, and the organic layer was extracted with a mixture of 15 ml. of saturated aqueous $Na_2CO_3$ solution plus 15 ml. of water and then with 25 ml. of water. The ethylacetate layer was dried over $Na_2SO_4$, filtered, and the filtrate was evaporated to dryness in vacuo to give 8.0 g. of crude product. This was recrystallized from 10 ml. of boiling absolute ethanol to give N-[2-(2-nitro-1-imidazolyl)ethyl]-isobutyramide, M.P. 112.5–114° C.

EXAMPLE 21

Preparation of capsules containing β-(2-nitro-1-imidazolyl)ethyl diethylamine

Per capsule, mg.
β-(2-nitro-1-imidazolyl)ethyl diethylamine _____ 50
Lactose, U.S.P. _____ 125
Corn starch, U.S.P. _____ 30
Talc, U.S.P. _____ 5
                                                  ——
Total weight _____ 210

Procedure (1) β-(2-nitro-1-imidazolyl)ethyl diethylamine was mixed with lactose and corn starch in a suitable mixer.
(2) The mixture was further blended by passing through a Fitzpatrick Comminuting Machine with a No. 1A screen with knives forward.
(3) The blended powder was returned to the mixer, the talc added and blended thoroughly.
(4) The mixture was filled into No. 4 hard shell gelatin capsules on a capsulating machine.

EXAMPLE 22

Preparation of tablets containing β-(2-nitro-1-imidazolyl)ethyl diethylamine

Per tablet, mg.
β-(2-nitro-1-imidazoly)ethyl diethylamine _____ 25.00
Lactose, U.S.P. _____ 64.50
Corn starch _____ 10.00
Magnesium stearate _____ 0.50

Procedure (1) β-(2-nitro-1-imidazolyl)ethyl diethylamine was mixed with the lactose, corn starch and magnesium stearate in a suitable mixer.
(2) The mixture was further blended by passing through a Fitzpatrick Comminuting Machine fitted with a No. 1A screen with knives forward.
(3) The mixed powders were slugged on a tablet compressing machine.
(4) The slugs were comminuted to a suitable mesh size (No. 16 screen) and mixed well.
(5) The tablets were compressed at a tablet weight of 100 mg. using tablet punches having a diameter of approximately ¼".

EXAMPLE 23

Preparation of capsules containing N-[2-(2-nitro-1-imidazolyl)ethyl]acetamide

Per capsule, mg.
N-[2-(2-nitro-1-imidazolyl)ethyl]acetamide _____ 50
Lactose, U.S.P. _____ 125
Corn starch, U.S.P. _____ 30
Talc, U.S.P. _____ 5
                                                  ——
Total weight _____ 210

Procedure (1) N-[2-(2-nitro-1-imidazolyl)ethyl]acetamide was mixed with lactose and corn starch in a suitable mixer.
(2) The mixture was further blended by passing through a Fitzpatrick Comminuting Machine with a No. 1A screen with knives forward.
(3) The blended powder was returned to the mixer, the talc added and blended thoroughly.
(4) The mixture was filled into No. 4 hard shell gelatin capsules on a capsulating machine.

EXAMPLE 24

Preparation of tablets containing N-[2-(2-nitro-1-imidazolyl)ethyl]acetamide

Per tablet, mg.
N-[2-(2-nitro-1-imidazolyl)ethyl]acetamide _____ 25.00
Lactose, U.S.P. _____ 64.50
Corn starch _____ 10.00
Magnesium stearate _____ 0.50

Procedure (1) N-[2-(2-nitro-1-imidazolyl)ethyl]acetamide was mixed with the lactose, corn starch and magnesium stearate in a suitable mixer.
(2) The mixture was further blended by passing through a Fitzpatrick Comminuting Machine with a No. 1A screen with knives forward.
(3) The mixed powders were slugged on a tablet compressing machine.
(4) The slugs were comminuted to a suitable mesh size (No. 16 screen) and mixed well.
(5) The tablets were compressed at a tablet weight of 100 mg. using tablet punches having a diameter of approximately ¼".

What is claimed is:
1. 1-[2-(2-nitro-1-imidazolyl)ethyl]-4-methylpiperazine.
2. 4-[2-(2-nitro-1-imidazolyl)ethyl]morpholine.
3. 1-(2-aminoethyl)-2-nitroimidazole.
4. β-(2-nitro-1-imidazolyl)ethyl diethylamine.

No references cited.

NICHOLAS S. RIZZO, Primary Examiner
J. TOVAR, Assistant Examiner

U.S. Cl. X.R.

260—250 R, 256.4 R, 247.2 A, 268 H, 293.7, 295, 295.5; 424—248